M. GUETT.
ELECTRIC SWITCH WALL CASE.
APPLICATION FILED JUNE 23, 1914.
1,161,046.
Patented Nov. 23, 1915.
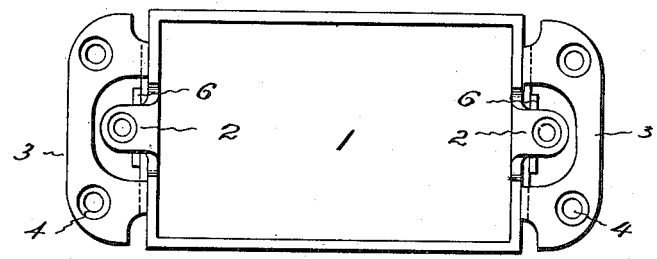
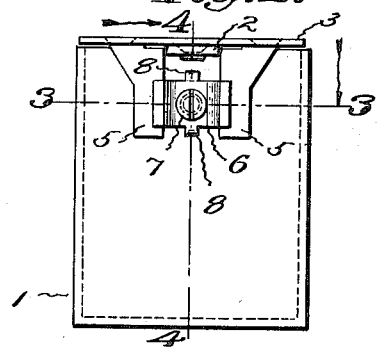
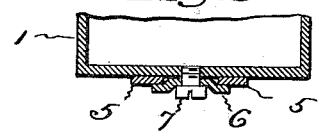
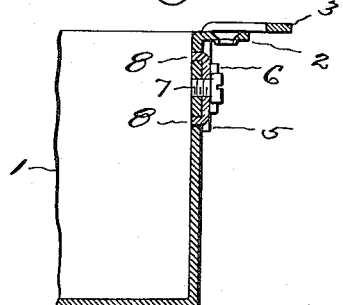
Witnesses.
Adolph C. Kaiser
Marie E. Meyer.
Inventor:
Monroe Guett
by Harry R. Williams
Atty.

UNITED STATES PATENT OFFICE.

MONROE GUETT, OF HARTFORD, CONNECTICUT, ASSIGNOR TO THE HART & HEGEMAN MANUFACTURING COMPANY, OF HARTFORD, CONNECTICUT, A CORPORATION OF CONNECTICUT.

ELECTRIC-SWITCH WALL-CASE.

1,161,046.      Specification of Letters Patent.      Patented Nov. 23, 1915.

Application filed June 23, 1914. Serial No. 846,736.

*To all whom it may concern:*

Be it known that I, MONROE GUETT, a citizen of the United States, residing at Hartford, in the county of Hartford and State of Connecticut, have invented a new and useful Improvement in Electric-Switch Wall-Cases, of which the following is a specification.

Flush electric switches are placed in wall cases or boxes that are set in openings in the walls of buildings. These cases have at the ends perforated ears for the screws which are used to fasten the cases in place. As it is some times desirable to fasten these ears against the outer surface of the finished wall, and some times necessary to locate them against a firmer part of the wall, such as the lath beneath the plaster, and owing to variation in the thickness of plaster or other finish applied to walls and the difficulty of getting the cases located exactly true in the wall, these attaching ears are fastened to the ends of the cases so that they may be reversed and also so that they may have slight adjustment in and out.

The object of this invention is to simplify the construction and method of fastening these attaching ears to the ends of wall cases or switch boxes. In attaining this object the attaching ear is made of a single piece of sheet metal bent to shape with a pair of legs having a space between them, that project at right angles from the perforated part that is applied to the wall, and that are adapted to fit against the outer surface of the end of the case and be securely held thereto in proper adjustment by a clamp plate that is fastened by a single screw.

Figure 1 shows a plan of a case provided with attachment ears that are fastened thereto according to this invention, Fig. 2 shows an end view of the case. Fig. 3 shows a horizontal section through one end of the case and the ear fastening means. Fig. 4 shows a vertical section through one end of the case and the ear fastening means.

The wall case or switch box 1 may be any desired shape, size and type. At each end the case is usually provided with a perforated lug 2 for the screw employed in fastening the switch in the case. The ears which are used for fastening the cases in a wall have a part 3, with perforations 4, that extends outwardly from the end of the case. Each of these ears also has a pair of legs 5 that are adapted to lie flat against the end of the case. A clamp plate 6 is arranged to hold the ear legs tightly against the end wall of the case. This plate is secured in position by a screw 7 that passes through it and into a threaded opening in the wall of the case between the legs of the attaching ear. The clamp plate shown has two inturned lugs 8 that extend into slots made in the end wall of the case between the legs. These lugs prevent the clamp plate from turning when the screw is turned. When this single screw is loosened the legs are free to be moved in or out along the end wall of the case so that the outwardly extending perforated part of the ear may be located in such position that when it is set against the surface to which it is to be fastened the case will be located properly in the wall to receive the switch and surface plate. The ears of course may be reversed as made necessary by the conditions found at the place of installation. When the screw is turned up the clamp plate binds the legs and the ear is held very securely in place. As a result of this simple and cheap construction much time is saved in the installation of these cases.

The invention claimed is:

1. The combination with a wall case of a clamp plate with lugs at its ends entering openings in the wall case to prevent the clamp plate from turning, a slotted attachment ear with portions on each side of the slot extending between the clamp plate and the wall case, and a screw passing through the clamp plate and the slot in the attachment ear for binding the clamp plate against the attachment ear and securing the parts in place.

2. The combination with a wall case of an attachment ear having legs lying against the end wall of the case, a clamp plate having a portion that lies between the said legs of the attachment ear and having lugs at its ends entering openings in the wall case to prevent the attachment ear and the clamp plate from turning, and a screw passing through the clamp plate and between the legs for binding the clamp plate against the attachment ear and securing the parts in place.

MONROE GUETT.

Witnesses:
M. BEIL,
ROLLIN N. PECK.